United States Patent [19]

Greene

[11] 4,329,573

[45] May 11, 1982

[54] CODED OPTICAL IDENTIFICATION SYSTEM

[76] Inventor: Leonard B. Greene, 944 Bayberry Dr., Arnold, Md. 21012

[21] Appl. No.: 141,669

[22] Filed: Apr. 18, 1980

[51] Int. Cl.³ .................. G06K 7/10; G02B 5/14
[52] U.S. Cl. ............................ 235/454; 235/470; 235/472; 235/473
[58] Field of Search .............. 235/454, 470, 472, 473

[56] References Cited

U.S. PATENT DOCUMENTS 3,786,238 1/1974 Heisner ........................ 235/454

FOREIGN PATENT DOCUMENTS 2659639 6/1978 Fed. Rep. of Germany ...... 235/454

Primary Examiner—Harold I. Pitts
Attorney, Agent, or Firm—Schwartz, Jeffery, Schwaab, Mack, Blumenthal & Koch

[57] ABSTRACT

A coded optical identification system includes a linear array of three-dimensional segments. A first plurality of the segments have planar surfaces thereon from reflecting light from a light source to a light sensor, and a second plurality of the segments have a sloping surface thereon for directing light from the light source away from the light sensor.

8 Claims, 5 Drawing Figures

CODED OPTICAL IDENTIFICATION SYSTEM

BACKGROUND OF THE INVENTION

The invention relates to light reflected, coded optical identification systems, specifically a target for reflecting light in such a way that a binary pattern of reflected light and nonreflected light can be interpreted by a sensing device as a binary code. The principal use contemplated for such device is to provide a system of optical character recognition in a hostile outdoor environment. Much interest has been focused on this general problem, particularly as it relates to systems having the ability to recognize and record, automatically, identifying numbers on railroad cars, trucks and ocean cargo containers.

Prior and current efforts in this field have depended on either surface reflection of light from plane surfaced targets coded with multi-colored striped or barred patterns, or on systems whereby light is projected through a target, and the code is read by a sensing device on the other side. There are disadvantages associated with both concepts. In the instance of colored panels it has been demonstrated through extensive experience that the patterns become coated with dirt, soot, etc. and become unreadable. In the second instance the need to have the illumination source and the sensing device on opposite sides of the target incurs serious mounting difficulties. This is especially true for ocean cargo containers which are essentially large boxes whereon the optical target must be mounted on some lateral surface of the container.

U.S. Pat. No. 3,255,177 is an early patent covering the color coded system mentioned above. The commercial form of this invention is marketed under the trade name of "KARTRAK" by the Servo Corporation of America, Hicksville, N.Y. Modifications of this system are disclosed in U.S. Pat. No. 4,002,889 assigned to the Servo Corporation.

In the second field of the invention cited above, U.S. Pat. No. 3,304,412 discloses a system wherein a light source mounted on the side of a rail track shines through a perforated coded target attached to the rail car journal box to be read by a track side sensing device.

Other patents relating to this general area are: U.S. Pat. Nos. 3,277,283 and 3,316,392.

As will be seen the present invention is conceived to overcome these shortcomings.

SUMMARY OF THE INVENTION

The present invention overcomes the above-identified shortcomings by providing a three-dimensional optical target comprised of a linear array of elements that reflect incident light in either of two directions, back toward the source or toward a light sensor. In so doing the target appears to the light sensor as a linear array of light or dark elements, light if the incident rays are reflected toward the sensor, dark if reflected toward the source. The sensor thus sees the target as a sequence of optical impulses that are readily interpretable as a sequence of zeros and ones. Connected to a suitable logic device, these binary sequences can be converted to an alphanumeric identification code.

BRIEF DESCRIPTION OF THE DRAWINGS

The above and other advantages will be better appreciated with reference to the accompanying drawings wherein.

DETAILED DESCRIPTION OF THE INVENTION

The present invention is limited to the optical target itself. There is an abundance of optical and electronic technology relating to reflected light impulses. The description provided herein will, therefore, concentrate on target details. However, as an aid to comprehension of how the target may be positioned on a container or other vehicle, one exemplary use will be briefly described and explained.

Figure 1:
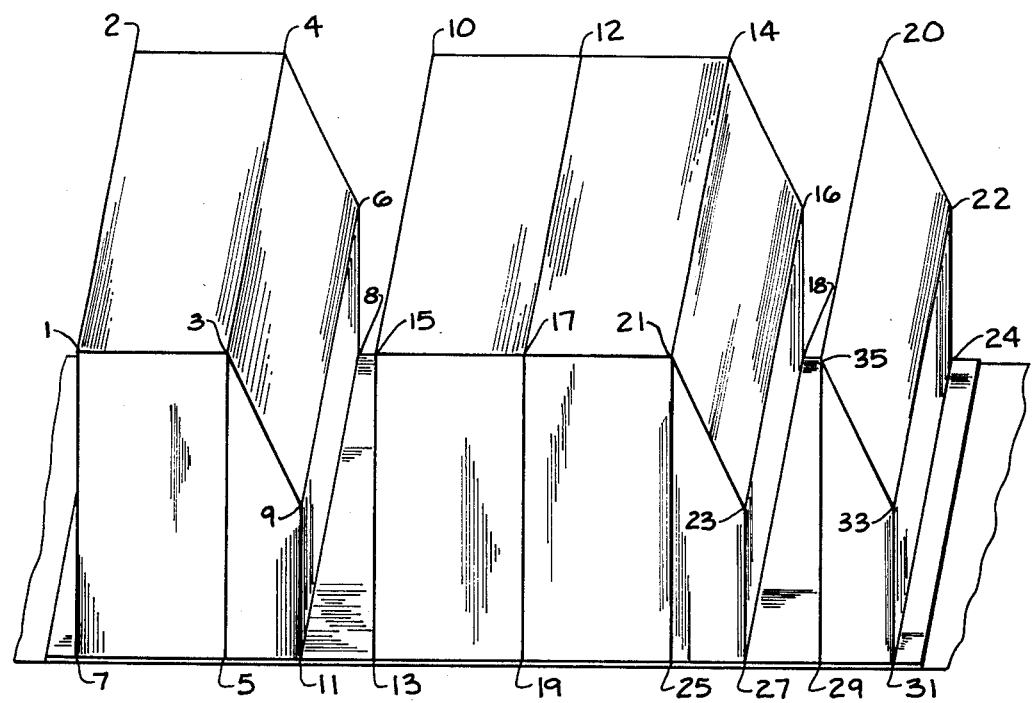
FIG. 1 is a perspective view of one configuration of a segment of the optical target in accordance with the present invention.

FIG. 1 shows an array of three-dimensional segments or solid prisms mounted on a plane base. Some of the prisms are rectangular in cross-section, for example, the prism defined by the points (1, 2, 3, 4, 5, 7 and other points hidden in the drawing). The prism comprising points 1, 2, 3, 4, 5, 6, 7 form a "planar segments". Other prisms are quadrilateral in cross-section, for example, the prism defined by the points (3, 4, 5, 6, 8, 9, 11 and another point hidden in the drawing). The prism formed by 3, 4, 5, 6, 8, 9, 11, 13, and hidden points 12 and 14, form a "sloping segment". The dimensions of the prisms are determined in the following manner:

The distances between the point pairs (5, 7), (5, 13), (13, 19), (25, 29) etc. are equal but arbitrary, but might in practice range from one-half to one inch in width. The distances between the point pairs (1, 7), (3, 5), (13, 15), (29, 35), etc. are also arbitrary, but might in practice range from one inch to one and one half inches. The distances, between point pairs (9, 11), (23, 27), and (31, 33) are preferably one-half those of (3, 5), (21, 25) etc., while the distances between point pairs (5, 11), (25, 27) and (29, 31) are one-half those of point pairs (5, 13), (13, 19), (25, 29), etc. There are spaces between some of the prisms. These spaces are outlined by such point groups (3, 4, 6, 8, 9, 10, 11, 13, 15) and another point hidden in the drawing), etc. The lengths of the prisms, i.e., the distance between point pairs (1, 2), (3, 4), (6, 9), (10, 15) etc. are also arbitrary but equal, and might in practice range from 6 to 12 inches.

The prisms may be constructed of any durable material, typically steel. The method of their attachment to the base is arbitrary. The parts of the prisms that are of interest are the outer, lateral, reflective surfaces defined by the planes spanned by point groups (1, 2, 3, 4), (3, 4, 6, 9), (6, 8, 9, 11) etc. The boundary planes of the spaces are, of course defined by the outer, lateral planes of the prisms and the base, for example, the planes spanned by the point group (6, 9, 8, 11) and (8, 11, 13 and a point hidden in the drawing).

Figure 2:
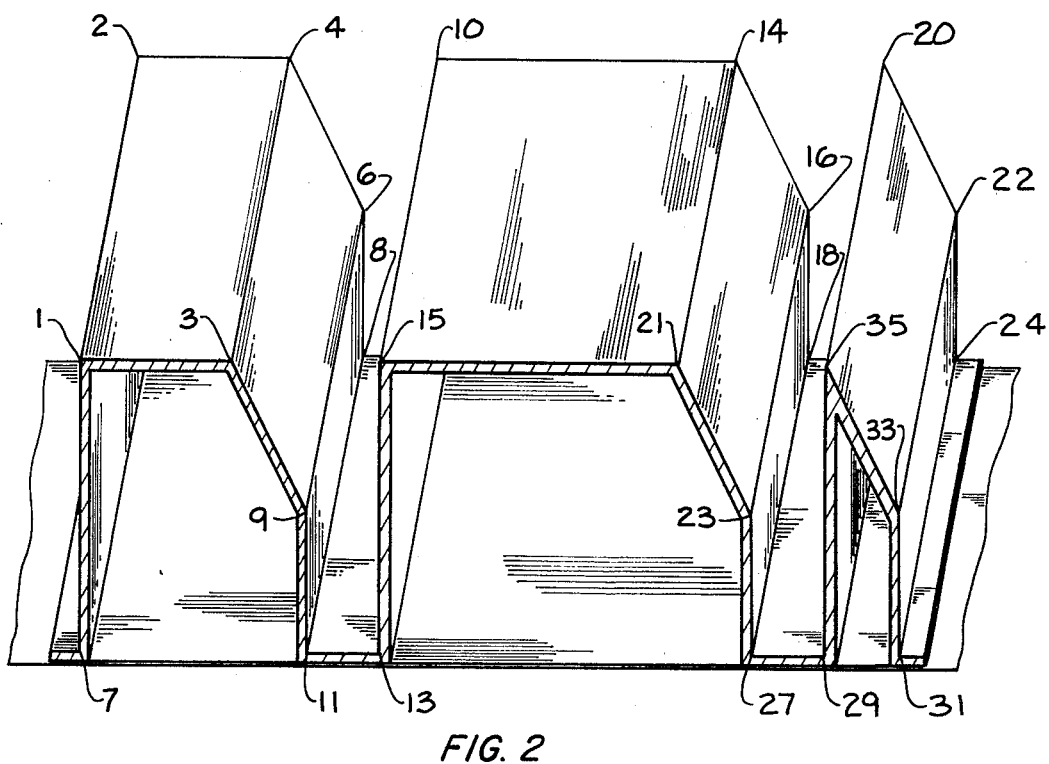
FIG. 2 is a perspective view of another configuration of a segment of the optical target in accordance with the present invention.

It is not necessary that these reflective surfaces be defined by prisms. FIG. 2 shows an equivalent set of surfaces defined by a sequence of corrugations of a sheet of material, typically steel. The reflective surfaces defined by the configuration shown in FIG. 2 have the same spatial relation as their equivalently numbered counterparts in FIG. 1.

Figure 3:
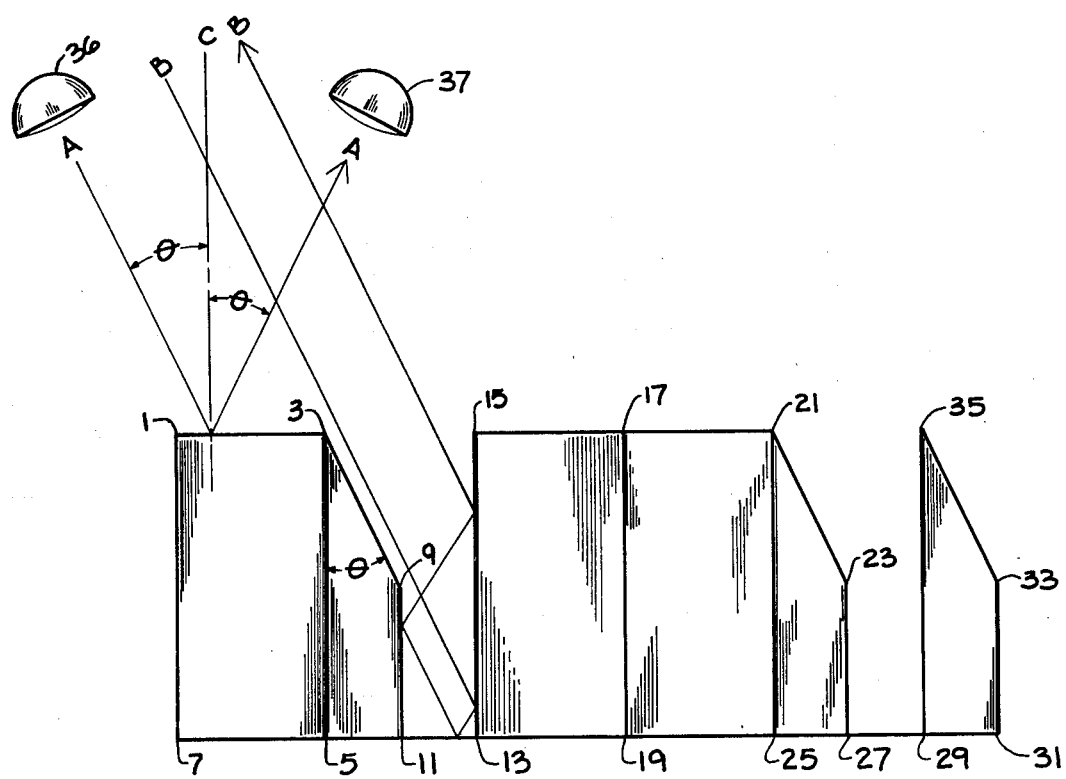
FIG. 3 is a side elevation view of the same segment of the optical target in accordance with the present invention, showing the optical principle of selective directional reflection of incident rays.

FIG. 3 shows the method by which the target achieves selective directional reflectivity. The number pairs (1, 3) correspond to the plane defined by the number group (1, 2, 3, 4) in FIGS. 1 and 2. Similarly, the number pairs (3, 9) correspond the plane defined by the number group (3, 4, 6, 9) and so forth.

The target is illuminated by a light source, 36. Light rays fall on the target at an incidence angle $\theta$, being the angle between the ray and a line, C, perpendicular to the base plane. The angle of incidence is also equal to the angle between the lines defined by the point pairs (3, 9) and (3, 5). All rays, A, falling on the surface (1, 3) will be reflected at an angle $\theta$ towards a light sensor, 37. All rays, B, falling in the space (3, 15) will be reflected back toward the source.

Because the target is three-dimensional and because the space between the reflecting planes are optically black to the sensors, accumulations of dirt, soot, and other contaminants will not confound the operation of the target. Rays incident on the upper surfaces, e.g., that surface defined by points (1, 2, 3, 4), even if that surface is soot covered, will be reflected specularly towards the sensor with sufficient intensity to be read, especially if the light source is very intense.

Furthermore, because the light source and light sensor are on the same side of the target there is no problem related to placement of the target on the side or other lateral surface of the vehicle.

Two generalized methods of illuminating of the target are now discussed.

If the light source, 36, is a narrow pencil of beams, narrow with respect to the angle subtended by points (36, 1, 3) or (36, 3, 15), and the target is in motion, say from right to left, then the sensor will in time perceive a sequence of alternating reflections and nonreflections of some time duration. If the received reflections are interpreted as "ones" (1) and the nonreflections as "zeros" (0), then the target segment shown above could be read as 1, 0, 1, 1, 0 base two, or equivalently as 22 base ten.

The target array can be made as long as desired to accommodate any character length, and check bits may be incorporated as well as start and end sequences. In this hypothetical illumination scheme there may arise the complication of distinguishing between repetitive sequences, such as 1, 1, 1, 1 or 0, 0, 0, 0 etc. In this case the target can comprise two side-by-side arrays, one containing the code, the other a timing sequence of alternating zeros and ones. If the two outputs are read simultaneously and added modulo 2, a simple logic is available to separate repetitive sequences and determine the content of the code.

An alternative illumination method is for the light source 36 to be a flash unit having beam width sufficient to illuminate the entire target with an approximately collimated burst of light (i.e., one wherein the individual rays do not substantially depart from the incidence angle $\theta$. If the light flash is triggered by the presence of the rail car, container, etc., and the target is in a prearranged standard position with respect to the triggering device the sensor will be presented with a still picture of the target. This picture can be scanned electronically by the sensor to determine the coded sequence.

Other illuminating and sensing systems are extant, but in any event the light falling on the target must be of sufficiently intensity to overcome casual light from other sources.

It is theoretically possible that the sensor, 37, be co-located with the source, 36. In this case the rays reflected back to the sensor could be interpreted as zeros. This arrangement is not likely to be as feasible, however, since each such ray would undergo four reflections, rather than one in the above illustrated manner, and would thus be subject to greater attenuation.

Figure 4:
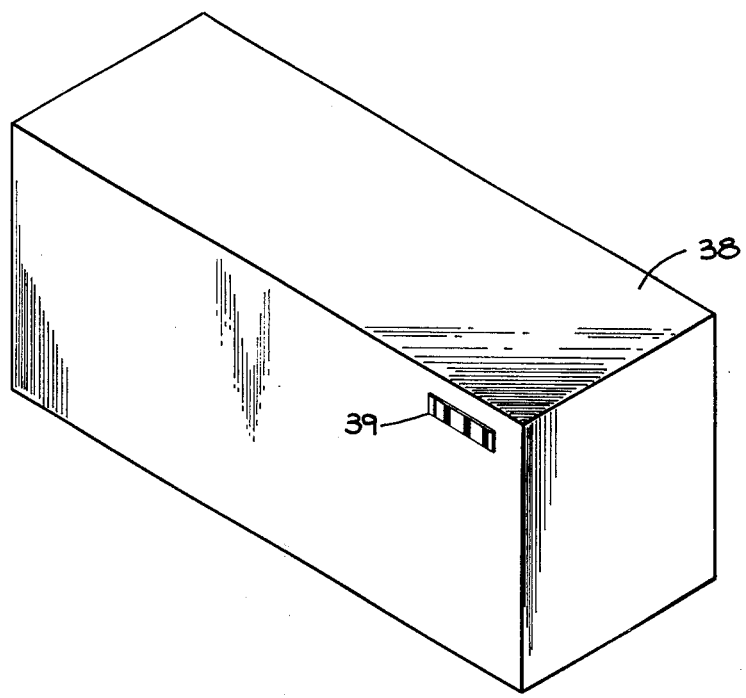
FIG. 4 is a perspective view of the optical target mounted on a typical ocean cargo container.

FIG. 4 shows a perspective view of an ocean container, 38, with the present target 39, mounted with its principal axis parallel to the earth. It is not necessary that it be thus mounted. It could be mounted perpendicular to the earth if the light source and sensor were similarly arranged.

Figure 5:
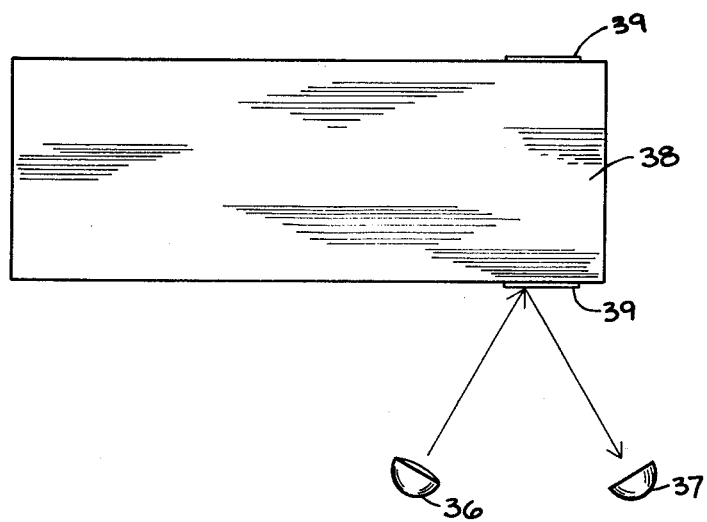
FIG. 5 is a plan view of an ocean cargo container with the present optical target mounted thereon, and showing feasible disposition of a light source and a light sensor with respect to the target.

FIG. 5 is a plan view of the ocean container seen from above. The light source 36 and sensor, 37, are shown in relationship to the target 28. Needless to say the target, 28, will need to be mounted on both sides of the vehicle.

While several embodiments of the invention have been described, it will be understood that it is capable of still further modifications and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A coded optical identification device comprising:
   (a) a substantially linear array formed by a plurality of three dimensional planar and sloping segments of substantially equal linear width adapted for mounting on an object to be identified,
   (b) said planar segments having a first substantially planar surface thereon,
   (c) said sloping segments having a first sloping surface sloping toward said object to be identified in the direction of said linear array,
   (d) said first sloping surface also being at an acute angle relative to a line perpendicular to said first planar surface.

2. The device as defined in claim 1 wherein said sloping segment includes a first portion approximately half the linear width of said planar segment.

3. The device as defined in claim 2 wherein said sloping segment includes a second substantially planar surface spaced from and substantially parallel to said first substantially planar surface, said second substantially planar surface extending approximately half the linear width of said sloping segment.

4. The device of claims 1, 2 or 3 wherein said linear width of said sloping segment is less than the height of said sloping segments.

5. A coded optical identification system comprising:
   (a) a substantially linear array formed by a plurality of three dimensional planar and sloping segments of substantially equal width, said array being adapted for mounting on an object to be identified, (b) said planar segments having a first substantially planar surface thereon, (c) said sloping segments having a first sloping surface sloping toward said object to be identified in the direction of said linear array, (d) said first sloping surface being at a first acute angle relative to a line perpendicular to said first planar surface, (e) a light source directing light toward said linear array in the direction of said linear array, said light source positioned at substantially said first acute angle relative to a line perpendicular to the surface of said first planar segment, (f) a light sensor positioned at a second angle, said second angle being approximately equal to said first acute angle but in a direction opposite to the direction of said linear array, and (g) said light source and said linear array being relatively movable in the direction of said linear array.

6. The system as defined in claim 5 wherein said sloping segment includes a first portion approximately half the linear width of said first planar segment.

7. The system as defined in claim 6 wherein said sloping segment includes a second substantially planar surface spaced from and substantially parallel to said first substantially planar surface, said second substantially planar surface extending approximately half the linear width of said sloping segment.

8. A method for optical identification comprising the steps of:

(a) mounting on an object to be identified a substantially linear array formed by a plurality of three dimensional planar and sloping segments of substantially equal width, said planar segments having a first substantially planar surface said linear array, said sloping surface being at a first acute angle relative to a line perpendicular to said first planar surface, (b) providing a light source, (c) directing light from said light source toward said linear array in the direction of said linear array at an angle approximately equal to said first acute angle, (d) providing a light sensor at a second angle, said second angle approximately equal to said first acute angle but in a direction opposite to the direction of said array, and (e) moving said object to be identified with said linear array mounted thereon relative to said light source and said light sensor.

* * * * *